United States Patent
Tashiro et al.

(10) Patent No.: US 6,782,744 B1
(45) Date of Patent: Aug. 31, 2004

(54) GAS FLOW RATE MEASURING APPARATUS

(75) Inventors: Shinobu Tashiro, Hitachinaka (JP); Shinya Igarashi, Naka-machi (JP); Hitoshi Ishikawa, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 09/767,687

(22) Filed: Jan. 24, 2001

(30) Foreign Application Priority Data

Jan. 24, 2000 (JP) ........................................ 2000-014856

(51) Int. Cl.[7] ................................................. G01F 1/68
(52) U.S. Cl. ................................................. 73/204.22
(58) Field of Search ........................ 73/204.22, 861.95, 73/204.24, 204.25, 204.15, 204

(56) References Cited

U.S. PATENT DOCUMENTS

| | | | | |
|---|---|---|---|---|
| 3,595,079 A | * | 7/1971 | Garn .............................. | 73/204 |
| 3,623,364 A | * | 11/1971 | Withrow ......................... | 73/204 |
| 4,523,461 A | * | 6/1985 | Watkins ........................ | 73/204 |
| 4,537,068 A | * | 8/1985 | Wrobel et al. ................ | 73/202 |
| 5,631,416 A | * | 5/1997 | Rilling et al. ............. | 73/204.22 |
| 5,756,893 A | | 5/1998 | Kondo et al. | |
| 6,327,905 B1 | * | 12/2001 | Itsuji et al. .............. | 73/204.15 |

FOREIGN PATENT DOCUMENTS

| | | |
|---|---|---|
| DE | 19828629 | 2/1999 |
| EP | 0561365 | 9/1993 |
| JP | 5-231899 | 9/1993 |
| JP | 9-4487 | 1/1997 |
| JP | 9-503310 | 3/1997 |

* cited by examiner

*Primary Examiner*—Edward Lefkowitz
*Assistant Examiner*—Jewel Thompson
(74) *Attorney, Agent, or Firm*—Crowell & Moring LLP

(57) ABSTRACT

A power transistor 1 is mounted on a metallic power supply terminal 40 within an intake pipe 20, individually and separately from an electronic circuit board 7 on which other electronic circuit element are mounted. This power supply terminal 40 acts as a terminal for electric power input and its one portion is exposed within the gas path of the intake pipe 20. The heat-generation of the power transistor 1 is effectively heat-generated by the metallic terminal 40 without giving a remarkable effect to the other circuit elements. With this, it is possible to reduce any heat effect to the other electronic circuit components due to the self heat-generation of the power transistor 1 without the additional number of parts and to effectuate the gas flow rate measuring apparatus of which measuring accuracy and reliability are high.

12 Claims, 4 Drawing Sheets

GAS FLOW RATE MEASURING APPARATUS

BACKGROUND OF THE INVENTION

This invention relates to a gas flow rate measuring apparatus for measuring flow rate (the amount of flow) of gas, and more particularly to a gas flow rate measuring apparatus using a heat-generating temperature sensing resistor to measure air flow rate sucked into the engine of an automobile, etc.

As the most general method for accurately controlling a gas fuel ratio for an internal combustion engine, there is a method for measuring intake gas flow rate and computing one-by-one the injection quantity which makes burning condition optima. A gas flow rate measuring apparatus for measuring intake gas flow rate is indispensable in this.

Thus, up to now, gas flow rate measuring apparatuses using various systems have been proposed, and are widely put to practical use. As one system of them, there is a heat-type gas meter which can detect the mass flow of gas.

In this heat-type gas meter, a temperature sensing resistor located within an intake gas flow path is included as a gas flow rate detecting element, which is electrically connected to a detecting circuit.

This detecting circuit is also called as a control circuit, which supplies a current to the temperature sensing resistor per se or a heater positioned adjacent thereto to heat-generate it, and at that time the amount of the supplied current is controlled so that the temperature of the temperature sensing resistor is always high by a fixed temperature with respect to the temperature of gas sucked into the internal combustion engine.

When the gas flows along the temperature sensing resistor, the amount of heat of which is deprived from the temperature sensing resistor increases, its proportion varies depending upon the rate at which gas flows, and based on this the value of the current supplied to the temperature sensing resistor or the heater also varies.

As a result, the amount of variation of the heating current supplied to the temperature sensing resistor becomes the value corresponding to gas flow rate.

Also, in order to obtain the correct amount of heat radiation from the heat-generating temperature sensing resistor, it is needed to detect the temperature of the gas to be measured, so another temperature sensing resistor is located within the intake gas flow path as an intake gas temperature detecting element.

An electric signal representing the amount of gas flow thus detected is inputted to an output processing circuit to be processed therein so that it conforms with the input voltage range necessary for an engine control device, and it is outputted as the output signal of the gas flow rate measuring apparatus.

An arrangement using such technique is, for example a gas flow rate measuring apparatus described in Japanese Patent Prepublication No. 4487/1997. This gas flow measuring apparatus comprises a module housing including therewithin an electronic circuit board, said module housing being inserted in the inside of an intake pipe, and therefore it constitutes a superior technique in which the heat generated by the electronic circuit board can be cooled by suction gas.

Incidentally, other examples of the gas flow rate measuring apparatus are shown in Japanese Patent Prepublication No. 231899/1993 and Japanese Patent Prepublication No. 503310/1997 (which corresponds to U.S. Pat. No. 5,631,416)

However, although the prior technique shown in above-mentioned Japanese Patent Prepublication No. 4487/1997 has the structure in which the heat generated by the electronic circuit board is cooled by intake gas, consideration for thermal effects which electronic components receive in case where the amount of heat to be cooled varies due to the amount of intake gas is not sufficient.

That is, the thermal type gas flow rate measuring apparatus has a power transistor mounted to the electronic circuit to provide supply current necessary for heat-generation, since it carries out the heat-generation by flowing a current through the temperature sensing resistor.

Because the power transistor produces self heat-generation at the time of current amplification, peripheral members and electronic circuit components receives heat effects thereby.

The electronic circuit board of the gas flow rate measuring apparatus is intended to reduce the number of parts, lower the cost due to the process reduction of mounting works and further make the product smaller by mounting on the same circuit board all electronic circuit parts other than a temperature sensing resistor for detecting gas flow rate and gas temperature.

Therefore, the power transistor is mounted on the electronic circuit board and the heat of this power transistor is thermally conducted to the circuit board on which it is mounted and then to a metallic base for the connection to the circuit board, whereby heat effect is given to the peripheral members and other electronic circuit elements.

Since the gas flow rate measuring apparatus is arranged so that it is positioned mainly within the inside of the intake pipe of an automobile engine, the heat of the electronic circuit board is carried away by intake gas, but the gas flow speed within the intake pipe is different depending upon the magnitude of the amount of intake gas of the engine. Particularly, when the engine is in idling condition, the gas flow speed is relatively slow, so there is produced the problem that in case where the heat of the circuit board is perfectly withdrawn therefrom, the nonconformity of an electronic circuit due to the heating of the circuit board, a measuring error due to temperature dependency each element and resistor, etc. have, or a detection error resulting from the fact that the temperature sensing resistor receives the heat effects, occurs.

SUMMARY OF THE INVENTION

An object of this invention is to effectuate a gas flow rate measuring apparatus with high reliability and accuracy which inhibits the heat effects originating from the self heat-generation of the power transistor.

In order to attain the above-mentioned object, this invention is arranged as follows.

(1) In a gas flow rate measuring apparatus having a flow rate detecting element for measuring gas flow rate, an electronic circuit electrically connected to said flow rate detecting element for controlling said flow rate detecting element and outputting a signal corresponding to gas flow rate, a housing for protecting said electronic circuit housed within said housing, and a terminal for communicating between said electronic circuit and an external equipment of the outside of said housing, a power transistor is supported by said terminal.

(2) Preferably, in (1), said flow rate detecting element comprises a temperature sensing resistor which heats in response to the application of a current, and said power transistor amplifies and controls the current to said heating and temperature sensing resistor.

(3) Also, preferably, in said (1) or (2), the collector electrode of said power transistor is jointed onto said terminal and the base and emitter electrodes of said power transistor are connected to said electronic circuit through respective conductive members.

(4) Also, preferably, in said (1), (2) or (3), said terminal consists of a metal such as copper of which thermal conductivity is large.

(5) Also, preferably, in said (1), (2), (3) or (4), said electronic circuit is located within a conduit line forming a gas path, and said terminal has a portion located to the outside of said conduit line, whereby the heat generated from by said power transistor is conducted to the outside of said conduit line through said terminal.

(6) Also, preferably, in said (1), (2), (3), (4) or (5), the terminal supporting said power transistor extends to the inside of the path within which gas flows from the inside of said housing, and a portion of the terminal is exposed within the gas.

(7) Also, preferably, in said (1), (2), (3), (4), (5) or (6), the terminal supporting said power transistor has an inductance component.

(8) Also, preferably, in said (1), (2), (3), (4), (5), (6) or (7), said housing is made from a resin, and said terminal is structured by plated wiring to said resinous housing, using an MID technology.

(9) In a gas flow rate measuring apparatus having a flow rate detecting element for measuring gas flow rate, an electronic circuit electrically connected to said flow rate detecting element for controlling said flow rate detecting element and outputting a signal corresponding to gas flow rate, a housing for protecting said electronic circuit housed within said housing, and a terminal for communicating between said electronic circuit and an external equipment of the outside of said housing, said housing is made from a resin, said resinous housing is formed by metal plate insert mold shaping, and a power transistor is supported to said metal plate.

(10) Preferably, the terminal for communicating with said external equipment is made from a metal, and said metal plate is formed together with said metal terminal and after the insert shaping into said resinous housing it is separated from said metal terminal.

In the gas flow rate measuring apparatus, the power transistor is supported by a terminal of the outside of a housing including the circuit board.

With this arrangement, it is possible to heat-radiate the amount of heat-generation of the power transistor to the terminal, to reduce the rise of temperature of the power transistor per se, and to prevent the circuit board from being heated directly.

When said terminal is made of copper family material having high heat conductivity, it is possible to increase heat-radiation effectiveness.

Also, the terminal supporting the power transistor has such a shape that it extends from the outside of the housing to the position at which it is exposed to intake gas in the inside of the housing. Heat-radiation is carried out through the exposed terminal, thereby to improve heat-radiation effectiveness.

DETAILED DESCRIPTION OF THE PREFFERED EMBODIMENTS

Hereinafter, the embodiments of this invention will be explained with reference to the drawings.

Figure 1:
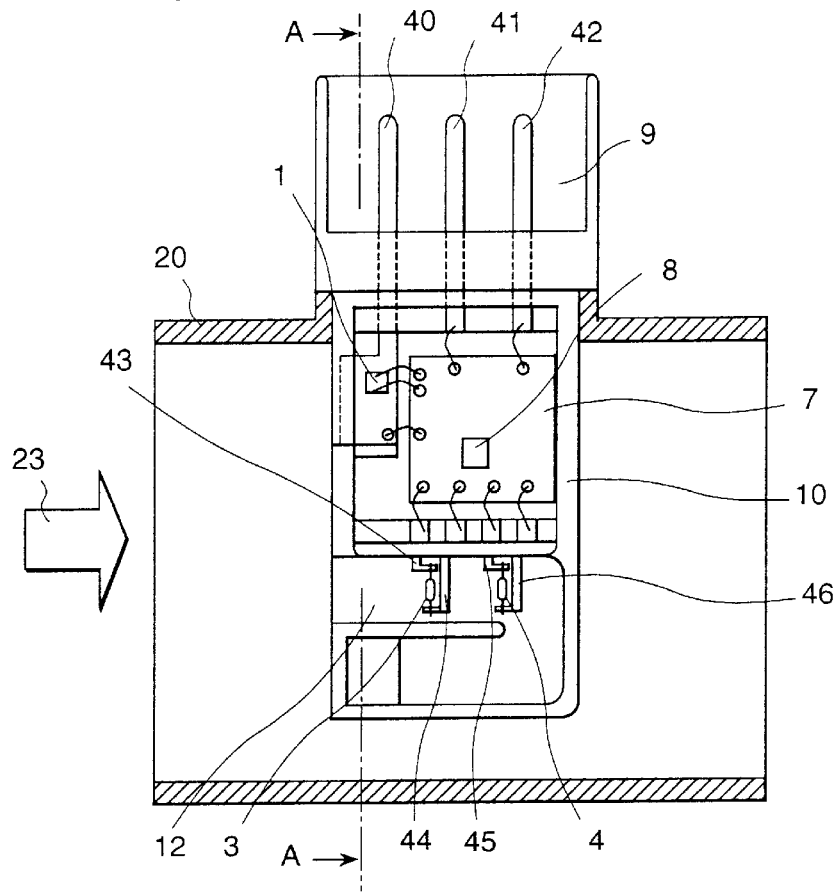
FIG. 1 is a schematic block diagram in the state in which a gas flow rate measuring apparatus which is a first embodiment according to this invention is attached to an intake pipe.
Figure 2:
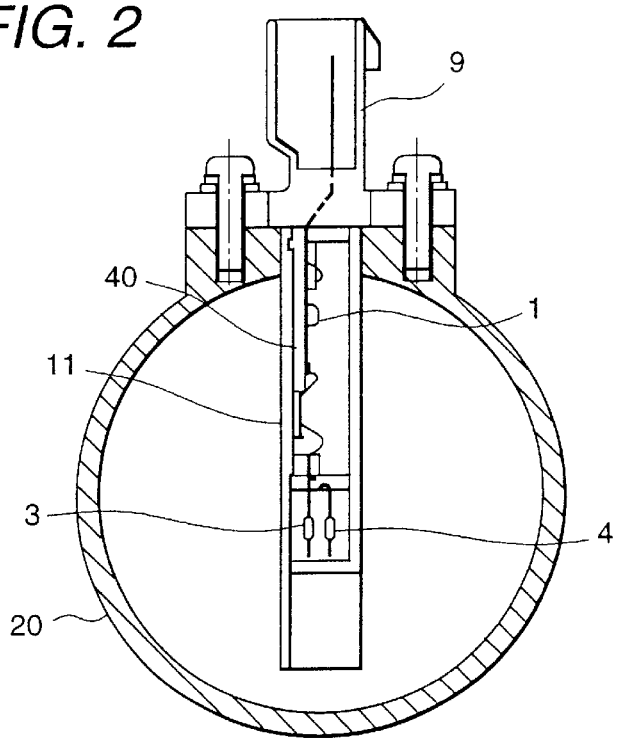
FIG. 2 is a schematic section diagram taken along A—A line in FIG. 1.

FIG. 1 is a schematic view of a gas flow rate measuring apparatus constituting one embodiment according to this invention with being attached to an intake pipe, and FIG. 2 is a schematic section view taken along A—A line in FIG. 1. Also, FIG. 3 is a schematic side view of the gas flow rate measuring apparatus shown in FIG. 1.

Figure 3:
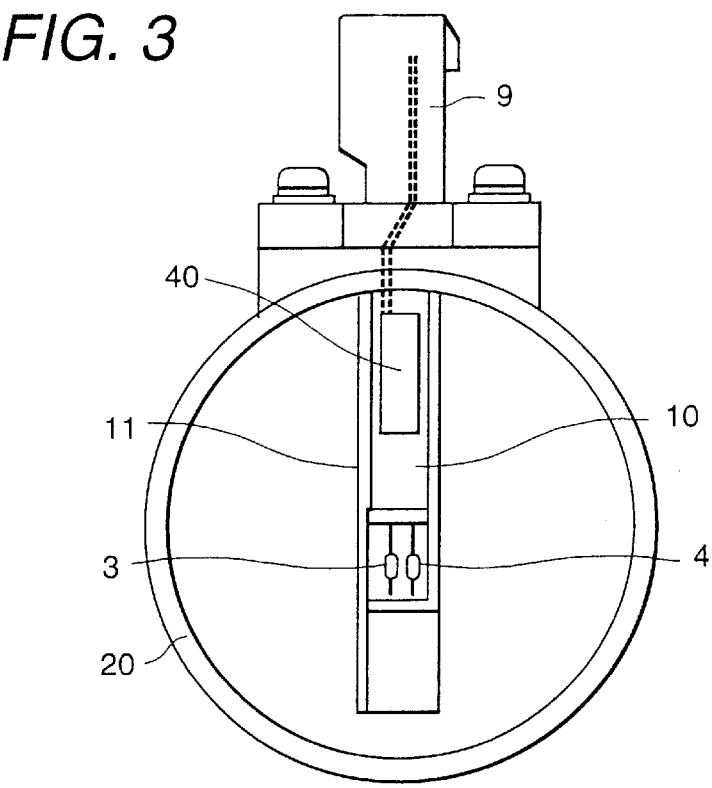
FIG. 3 is a schematic side view of the gas flow rate measuring apparatus shown in FIG. 1.

In FIGS. 1 to 3, a temperature sensing resistor 3 for detecting the amount of gas flow rate and a temperature sensing resistor 4 for temperature compensation for detecting temperature are located in the inside of an intake pipe 20 within which gas 23 flows which is introduced into an internal combustion engine, and these temperature sensing resistor 3 and temperature sensing resistor 4 for temperature compensation are electrically coupled to an electronic circuit board 7 also located in the internal of the intake pipe 20.

As the electronic circuit board 7, alumina ceramics shaped to a plate, which can withstand against high temperature because it is positioned within the engine room of an automobile, is used. On the surface of the alumina ceramics thick-film conductors are printed and thick-film resistor paste is applied, and thereafter conductive and resistive patterns are formed through baking. On this conductive patter a semiconductor element 8 such as an operational amplifier, etc. is mounted by soldering.

Of cause, another electronic circuit such as s mould package IC, etc. for example, can be used in a different manner from the illustrated first embodiment of this invention, but since its effect is the same, the explanation of this another electronic circuit is omitted.

The electronic circuit board 7 is fixed and bonded to a base plate 11 made of a sheet metal surrounded by a resinous housing 10 with its substantially entire side covered so that the electronic circuit board 7 is protected by the resinous housing 10. Also, the sheet metal base plate 11 is integrated with the resinous housing 10 by adhesion bonding or insert shaping.

Incidentally, the electronic circuit board 7 may be fixed and protected by a resinous box-like housing having a bottom surface, without using the sheet metal base plate 11.

The resinous housing 10 comprises a plastic part, and has metallic poles 43, 44, 45 and 46 for supporting the temperature sensing resistor 3 for gas flow rate detection and temperature sensing resistor 4 for gas temperature detection fixed thereto, and metallic terminals 40, 41 and 42 for connecting the electronic circuit board 7 housed within the resinous housing 10 to an external equipment, said metallic poles and metallic terminals being insert-shaped.

The resinous housing 10 has a sub gas path 12 for passing therethrough a portion of gas 23 inhaled into an internal combustion engine and a connector 9 for the connection to the external equipment, said sub gas path and connector being integrated with the resinous housing 10.

The electronic circuit board 7 is characteristic-adjusted as needed, and it is closed and protected by a sheet-like resinous cover fixed to the resinous housing 10 by adhesive bonding, etc.

The electronic circuit board 7 housed within the resinous housing 10, sub gas path 12 and the temperature sensing resistors 3 and 4 are located in the inside of the intake pipe 20 through which gas 23 introduced into the internal combustion engine flows. Also, the connector 9 integrated with the resinous housing 10 is fixed so that it positions at the outside of the intake pipe 20.

The input/output terminals 40, 41 and 42 made of metal which are located in the connector 9 pass from the inside of the resinous housing 10 through the inside of the connector 9, and are electrically connected to the electronic circuit board 7 through conductive members such as metallic wires or the like.

Said metallic input/output terminals may comprise a power supply terminal 41 to which power necessary to drive the gas flow rate measuring apparatus, an output terminal 41 for outputting a flow rate signal from the gas flow rate measuring apparatus and a ground terminal which acts as a ground (earth) line, etc.

The metallic power supply terminal 40 is shaped by pressing or the like at the same time of the other input/output terminals 41 and 42 so that it passes from the interior of the connector 9 through the inside of the resinous housing 10, and further it extends to a position at which it exposed to intake gas 23. The metallic power supply terminal 40 is configured so that it is exposed to the outside of the resinous housing 10, within the inside of the intake pipe 20 (refer to FIG. 3). Therefore, the exposed metallic power supply terminal 40 is cooled by intake gas within the intake pipe 20.

The power supply terminal 40 is, in addition, intended to electrically connect it to the electronic circuit board 7 through the conductive member in the same way as the other input/output terminal 41 and 42, and mounts (or supports) by soldering or the like a power transistor 1 for amplifying the current which is supplied to the heat-generating temperature sensing resistor 3.

Figure 4:
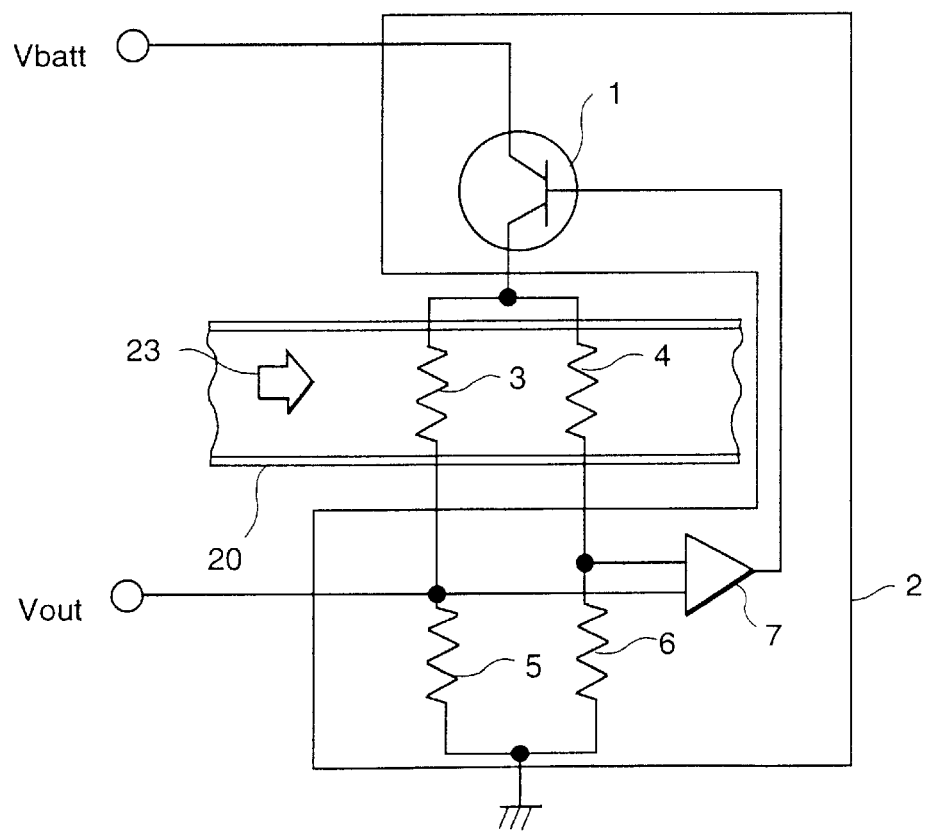
FIG. 4 is a circuit diagram of a gas flow rate measuring apparatus using a heat-generating temperature sensing resistor.

FIG. 4 is a circuit diagram of the gas flow rate measuring apparatus using the heat-generating temperature sensing resistor. It is necessary that the temperature sensing resistor 3 carry out heat-generation to detect the amount of gas flow depending upon the magnitude of heat radiation. To this end, the power transistor 1 amplitudes the current necessary for the heat-generation, which is supplied hereto.

In FIG. 4, a control circuit 2 for the gas flow rate measuring apparatus is basically made up by a bridging circuit having two bridge center points of which voltages are inputted to an operational amplifier 7 to compare the respective voltages and carry out such control that both of them becomes the same voltage values.

Two temperature sensing resistors 3 and 4 placed within the gas path 20 are connected to the control circuit 2 as portions of resistors made up by the bridging circuit and controlled by the operational amplifier 7 included in this control circuit 2.

In arranging the gas flow rate measuring apparatus, it is preferable that the electronic circuit parts other than the temperature sensing resistors 3 and 4 for detecting the amount of gas and the temperature of gas, respectively, are mounted on the same circuit board.

It is because it is possible to intend to reduce the number of parts, lower the cost due to the process reduction of mounting works and make the product smaller.

However, since the power transistor 1 produces self heat-generation at the time of the current amplification, if it is mounted on the same board together with the other electronic circuit elements, the problem that the peripheral electronic circuit elements, etc. on the board receive heat effect ness, occurs.

The thermal endurance of the semiconductor element 8 such as the operational amplifier or the like is not so serious problems because the self heat-generation of the power transistor 1 can be heat-radiated to some extent, by mounting it on a ceramic board having good heat conductivity and joining the ceramic board to the sheet metal base plate 11 constituting the bottom face portion of the circuit case.

Also, although the semiconductor element 8 and the thick-film resistors formed by print-baking on the surface of the ceramic board have temperature dependency with respect to their output characteristics and values of resistance, which changes the circuit characteristic, it is possible to cope with to same extent the affection of the heat-generation of the power transistor by arranging a characteristic temperature compensating circuit in the electronic circuit which can carry out output correction even though a temperature change occurs.

However, in case where the power transistor 1 is mounted on the electronic circuit board 7, the heat of the ceramic board 7 heated by the self heat-generation of the power transistor 1 is transmitted to the sheet metal base plate 11 fixing the board 7 by adhesive bonding or the like, whereby the metallic base plate 11 having high thermal conductivity is wholly heated.

Now, the temperature sensing resistor 4 for detecting the temperature of intake gas 23 is placed in the inside of the sub gas path 12 of which one periphery side wall is made up by the sheet metal base plate 11 and of which other side wall is made up by the resinous housing 10.

Therefore, as the heat of the power transistor 1 is heat-conducted to the base plate 11, further the heat of the base plate 11 is heat-transmitted to gas in the inside of the sub gas path 12. Thus, the temperature sensing resistor 4 for detecting the temperature of intake gas receive the heat affection resulting from the self heat-generation of the power transistor 1, whereby an error can occur in the temperature to be detected.

Of course, since the gas flow rate measuring apparatus is located within the intake pipe 20 of the internal combustion engine, intake gas 23 has its flow speed corresponding to the output of the internal combustion engine, and therefore although it takes the heat of the base plate 11, a difference of the amount of heat transfer exists depending upon a change of the gas flow speed.

That is, under a condition that the flow speed of intake gas 23 is a very low flow speed on the order of 0.5 m/s, the base plate 11 becomes the heat radiation condition at the time of the natural convection, so the temperature sensing resistor would receive a heat effect. Conversely, in case where the flow speed of intake gas 23 is high, gas takes the almost heat of the base plate 11 and it is cooled, and therefore the inside of the sub gas path 12 becomes equal to the temperature of intake gas. The flow speed dependency of the temperature detection error due to this heat effect comes into question.

Accordingly, by such the arrangement that the power transistor 1 is joined and mounted on the metallic terminal 40 integrated with the above-mentioned resinous housing 10 by using solder, conductive adhesive or the like, it becomes difficult that the circuit board 7 and the metallic base plate 11 receive the heat effect. With this, it is possible to reduce the detection error of the temperature sensing resistor 4 for temperature detection and to effectuate the gas flow rate measuring apparatus having high measuring accuracy.

Also, by such the arrangement that the metallic terminal 40 is exposed from the resinous housing 10, the metallic terminal 40 functions as a heat sink, and therefore it is possible to reduce the heat effect due to the self heat-generation of the power transistor 1.

By the way, since the temperature sensing resistor 4 for temperature detection receives the heat effect from the sheet metal base plate 11, it will be mentioned whether or not by replacing it with a resinous base plate the heat effect of the temperature sensing resistor 4 for temperature detection can be improved.

In case where the metallic base plate 11 is configured by the resinous base plate, since resin is low in heat conductivity in comparison with metal, that is high in conductive heat resistance, only the adjacent portion of the ceramic board on which the power transistor 1 is mounted receives the heat effect, and the heat effect of the interior of the sub gas path 12 which surrounds the temperature sensing resistor 4 for temperature detection can be reduced. Inversely, since heat radiation goes bad compared to the metallic base plate, the inside of the housing 10 which houses the electronic circuit board 7 can be filled with heat.

Since the gas flow rate measuring apparatus is mainly used for an automobile and so it is positioned under a high temperature atmosphere, it receives the effects of radiation heat, etc. due to the heat-generation of the engine in addition to the heat due to the self heat-generation of the power transistor 1, so the semiconductor element 8, etc. mounted on the electronic circuit board is in danger of having exceeded its high-temperature side temperature composition range.

Also, since the heat radiation from base plate 11 has been inhibited, heat is transferred to the conductive pole to which the temperature sensing resistor 4 integrated with the housing 10 is fixed by welding or the like, there is the possibility that the temperature sensing resistor 4 for gas temperature detection in question receives the heat effect.

Therefore, with the replacement of the sheet metal base plate 11 with the resinous base plate it is difficult to improve the heat effect of the temperature sensing resistor 4 for temperature detection.

As mentioned above, in accordance with the first embodiment of this invention, by such the arrangement that the power transistor 1 is mounted individually and separately from the electronic circuit board on which the other electronic circuit elements are located, on the metallic power supply terminal 40 and a portion of the power supply terminal 40 is exposed within the gas path, it is possible to reduce the heat effect due to the self heat-generation of the power transistor 1, which the other electronic circuit components receive, without increasing the number of parts, and to effectuate the gas flow rate measuring apparatus having high measuring accuracy and high reliability.

Incidentally, by such an electrical arrangement that the one face of the power transistor 1 is made to the collector electrode and the other face is made to two electrodes of the base and emitter, the collector electrode of the power transistor 1 being joined on the power supply terminal by using solder or conductive bond, it is possible to conspire electrical conduction. At that time, the base electrode and emitter electrode on the other face of the power transistor 1 are connected to the electronic circuit board through respective conductive member such as metal wires, etc.

With this, the power supply terminal 40 can operate not only the heat radiating member but also an electronic component, and therefore it is possible to radiate heat effectively against the heat-generation of the power transistor 1, without the need of an additional heat radiating member for only the heat radiation purpose.

Also, by using a copper family material of which coefficient of thermal conductivity is high, it is possible to provide effective heat transfer to the mounting portion of the power transistor 1, to which heat is to be transmitted, and inversely it is possible to further reduce the heat effect to the peripheral parts and electronic component to which heat is not to be transmitted. Incidentally, the power transistor may be replaced with an electronic part (a resistor or a diode) attached to the power supply terminal 40 which generates heat at all.

Figure 5:
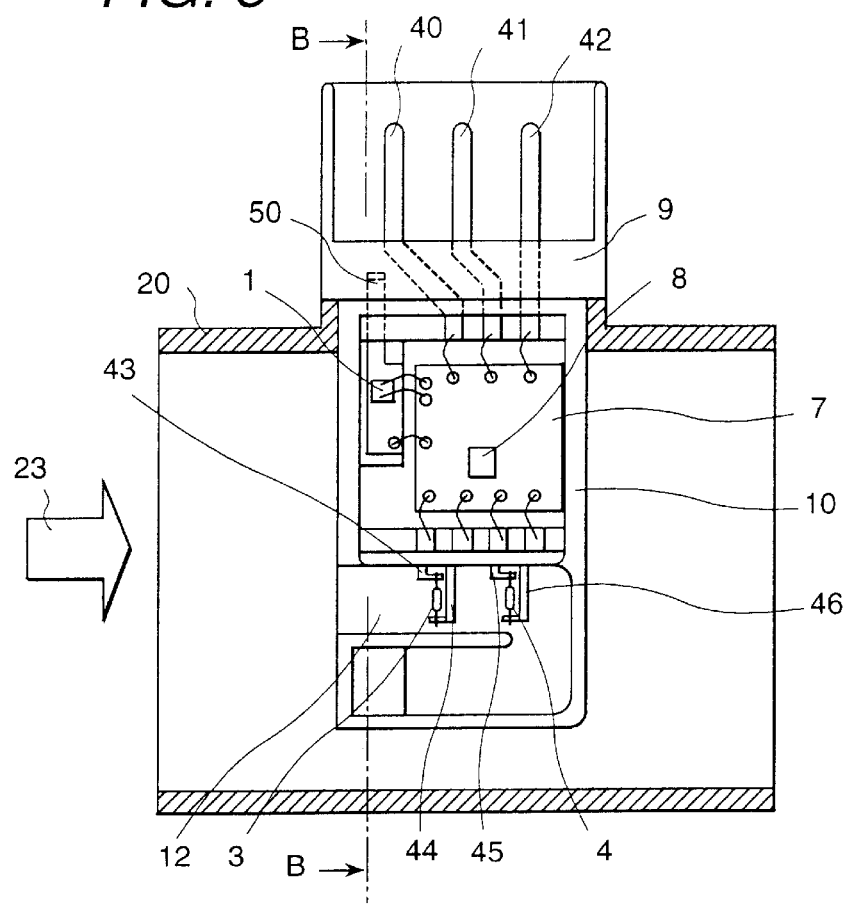
FIG. 5 is a schematic block diagram in the state in which a gas flow rate measuring apparatus which is a second embodiment according to this invention is attached to an intake pipe.
Figure 6:
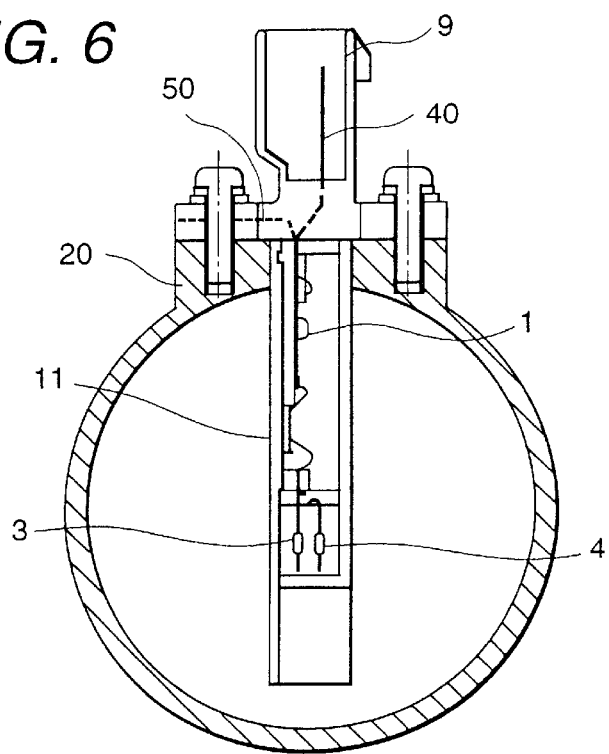
FIG. 6 is a schematic section diagram taken along B—B line in FIG. 5.

FIG. 5 is a schematic block diagram in the state in which the gas flow rate measuring apparatus according to a second embodiment of this invention is attached to an intake pipe, and FIG. 6 is a schematic section view taken along B—B line in FIG. 5.

In this second embodiment, the power transistor 1 is mounted on a metal plate 50 provided separately from the power supply terminal 40, not on it, and the other arrangement is the same as in the above-mentioned first embodiment.

In FIGS. 5 and 6, the metal plate 50 on which the power transistor 1 is mounted is shaped by pressing or the like at the same time of the shaping of the metallic power supply terminal 40, etc which are located within the connector 9, comprises the same material as that of the metallic power supply terminal 40, etc., and formed by insert mould shaping in the same manner as in the power supply terminal 40 in the first embodiment in FIG. 1.

For the metal plate 50, a copper family material for example of which coefficient of heat conductivity is high is used, whereby it is possible to provide positively the heat transfer of heat due to the self heat-generation of the power transistor 1 to the metal plate 50.

This metal plate 50 is effective electronic circuitry means in case where it is difficult to mount the power transistor 1 on the metallic power supply terminal 40.

As mentioned above, also in the second embodiment of this invention, it is possible to reduce the heat effect which the electronic circuit board 7, the base plate 11 and the temperature sensing resistors 3 and 4 would receive, and to effectuate the gas flow rate measuring apparatus having high measuring accuracy and high reliability.

Figure 7:
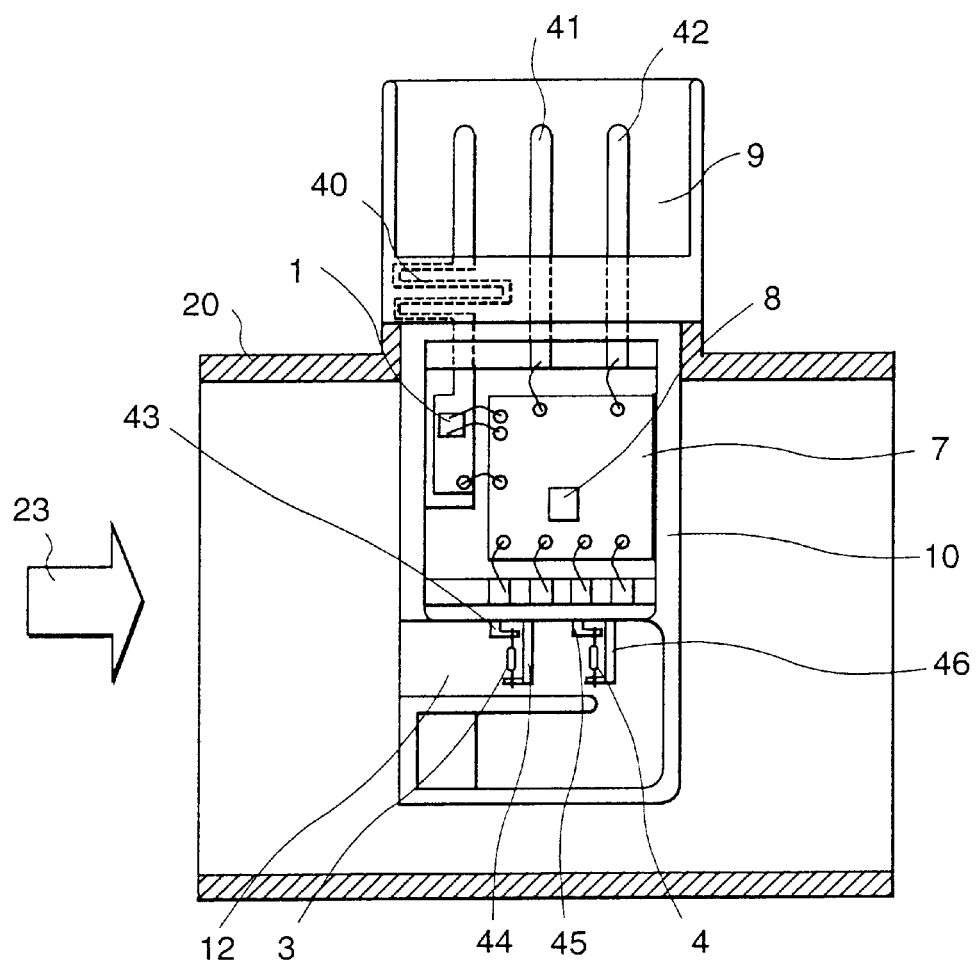
FIG. 7 is a schematic block diagram in the state in which a gas flow rate measuring apparatus which is a third embodiment according to this invention is attached to an intake pipe.

FIG. 7 is a schematic block diagram in the state in which the gas flow rate measuring apparatus according to a third embodiment of this invention is attached to an intake pipe.

In this third embodiment, the power transistor 1 is connected to the power supply terminal 40 as in the first embodiment, but the shape of this power supply terminal 40 is different from that in the first embodiment. The other arrangement of the third embodiment is the same as in the first embodiment.

The metallic terminal 40 has its shape within the connector 9 in the form of a coil such that the directions of the current supplied thereto are alternate for it to have an inductance component.

The power supply terminal 40 having the portion formed in the form of the coil operates to supply stable electric power to the electronic circuit 7 even though a high frequency current such as electromagnetic noises, etc. is applied, by transforming the noises to heat due to the alternate directions of the current.

As mentioned above, in accordance with the third embodiment of this invention, there can be obtained the same effect as in the first embodiment, and in addition thereto, it is possible to effectuate the gas flow rate measuring apparatus which can supply stable electric power to the electronic circuit 7 even though a high frequency current such as electromagnetic noises, etc. is applied.

Incidentally, the connector terminals such as the above-mentioned power supply terminal 40, output signal terminal 41, ground terminal 42, etc. can be formed by metal paint wiring to the resinous housing 10 using an MID (Molded Interconnection Device) technology.

Also, although the above-mentioned examples relate to a case where this invention has been used for controlling the current to a heat-generating resistor, this invention is not limited to this, but it is applicable to an example where a power transistor is used and the heat-generation of this power transistor give effects to adjacent electronic circuit elements.

In accordance with this embodiment, it is possible to effectuate a gas flow rate measuring apparatus having high reliability and high accuracy by inhibiting heat effects resulting from the self heat-generation of the power transistor.

Furthermore, the power transistor mounting portion which is the member to transmit heat can transmit the heat effectively by using a copper family material having the efficiency of heat conductivity for the metal terminal, and inversely it is possible to further reduce the heat effect to the adjacent members and electronic circuit components which are the members to which the heat is not to be transmitted.

Thus, it is possible to prevent any reduction of the detection accuracy of the temperature sensing resistor for temperature detection and to eliminate a contributing factor by which output characteristic accuracy decreases.

Also, since the corrector electrode of the power transistor is directly joined onto the power supply terminal and the base electrode and emitter electrode are connected to the circuit board through respective metal wires, it is possible to arrange a circuit also electrically, and to attain the subject of the invention without using additional heat radiation part for only the heat radiation purpose.

As a result, it is possible to provide a physical quantity detecting apparatus and gas flow rate measuring apparatus of which reliability and accuracy are high.

Also, with the arrangement in which the metal terminal on which the power transistor is mounted has the portion formed in the form of a coil, it is possible to effectuate the gas flow rate measuring apparatus which can have improved accuracy by inhibiting the heat effect resulting from the self heat-generation of the power transistor, and can supply stable electric power to the electronic circuit even though a high frequency current such as electromagnetic noises, etc. has been applied.

Hereinabove, this invention was explained with respect to the gas flow rate measuring apparatus. Clearly, if it is used in connection with a heat-generating temperature sensing resistor to measure air flow rate sucked into the engine of an automobile, etc. the gas of which flow rate is measured is air. However, the gas may be hydrogen gas, natural gas or the like other than air.

What is claimed is:

1. A gas flow rate measuring apparatus having a flow rate detecting element for measuring gas flow rate, an electronic circuit electrically connected to said flow rate detecting element for controlling said flow rate detecting element and outputting a signal corresponding to gas flow rate, a housing for protecting said electronic circuit housed within said housing, and a terminal arranged to communicate between said electronic circuit and external equipment located outside said housing, wherein an electronic part comprising said electronic circuit is mounted on said terminal.

2. A gas flow rate measuring apparatus according to claim 1, wherein said electronic part is a power transistor.

3. A gas flow rate measuring apparatus according to claim 2, wherein said flow rate detecting element comprises a temperature sensing resistor which heats in response to the application of a current, and said power transistor amplifies and controls the current to said heating and temperature sensing resistor.

4. A gas flow rate measuring apparatus according to claim 2, wherein the collector electrode of said power transistor is jointed onto said terminal and the base and emitter electrodes of said power transistor are connected to said electronic circuit through respective conductive members.

5. A gas flow rate measuring apparatus according to claim 2, wherein said terminal consists of a metal such as copper of which thermal conductivity is large.

6. A gas flow rate measuring apparatus according to claim 2, wherein said electronic circuit is located within a conduit line forming a gas path, and said terminal has a portion located to the outside of said conduit line, whereby the heat generated from by said power transistor is conducted to the outside of said conduit line through said terminal.

7. A gas flow rate measuring apparatus according to claim 2, wherein the terminal supporting said power transistor extends to the inside of the path within which gas flows from the inside of said housing, and a portion of the terminal is exposed within the gas.

8. A gas flow rate measuring apparatus according to claim 1, characterized in that the terminal supporting said power transistor has an inductance component.

9. A gas flow rate measuring apparatus according to claim 2, wherein said housing is made from a resin, and said terminal is structured by plated wiring to said resinous housing, using an MID technology.

10. A gas flow rate measuring apparatus having a flow rate detecting element for measuring gas flow rate, an electronic circuit electrically connected to said flow rate detecting element for controlling said flow rate detecting element and outputting a signal corresponding to gas flow rate, a housing for protecting said electronic circuit therein and a terminal for communicating between said electronic circuit and an external equipment of the outside of said housing, wherein said housing is made from a resin, and is formed by metal plate insert mold shaping, and an electronic part constituting said electronic circuit is mounted on said terminal.

11. A gas flow rate measuring apparatus according to claim 10, wherein said electronic part is a power transistor.

12. A gas flow rate measuring apparatus according to claim 11, wherein the terminal for communicating with said external equipment is made from a metal, and said metal plate is formed together with said metal terminal and after the insert shaping into said resinous housing it is separated from said metal terminal.

* * * * *